United States Patent [19]

Matsuo

[11] 4,022,406
[45] May 10, 1977

[54] AUTOMATICALLY VARIABLE MULTISTAGE PARACHUTE

[75] Inventor: Jon T. Matsuo, El Centro, Calif.

[73] Assignee: The United States of America as represented by the Secretary of the Navy, Washington, D.C.

[22] Filed: June 23, 1975

[21] Appl. No.: 589,180

[52] U.S. Cl. .............................................. 244/152
[51] Int. Cl.² ...................................... B64D 17/34
[58] Field of Search .......................... 244/152, 149

[56] References Cited

UNITED STATES PATENTS

| 1,378,198 | 5/1921 | Smith | 244/152 |
|---|---|---|---|
| 1,519,857 | 12/1924 | Lucas | 244/152 |
| 2,398,795 | 4/1946 | Manson et al. | 244/152 |
| 3,721,409 | 3/1973 | Matsuo et al. | 244/152 |

FOREIGN PATENTS OR APPLICATIONS 417,048   7/1921   Germany ....................... 244/152

*Primary Examiner*—Trygve M. Blix
*Assistant Examiner*—Barry L. Kelmachter
*Attorney, Agent, or Firm*—R. S. Sciascia; G. J. Rubens

[57] ABSTRACT

By providing a parachute canopy with a pull down vent line having predetermined elastic properties, the inflation development time of the parachute can be automatically controlled commensurate with the parachute deployment airspeed. This construction will prevent the accidental development of an excessively deformed drag surface, especially at low air speeds, that can produce wide oscillations of the parachute, causing discomfort and possibly injury to the parachutist upon landing.

1 Claim, 4 Drawing Figures

LOW AIRSPEED

INTERMEDIATE AIRSPEED

HIGH AIRSPEED

AUTOMATICALLY VARIABLE MULTISTAGE PARACHUTE

CROSS REFERENCE TO RELATED APPLICATION

The present invention relates to my prior patent application, Ser. No. 419,851 for "Apparatus and Method for Controlling the Inflation Time and Applied Snatch Forces on a Parachute" filed on Nov. 28, 1973, and issued as U.S. Pat. No. 3,887,151.

BACKGROUND OF THE INVENTION

This invention relates to parachute construction, and more particularly to a parachute wherein the inflation/development time of the canopy can be automatically controlled in proportion to the ejection airspeed.

In my above patent application, the inflation time of a multistage parachute is controlled sequentially in proportion with its deployment airspeed by employing a non-elastic pull down vent line that is foreshortened by means of a plurality of spaced breakcords. The breakcords are constructed with varying tensile strengths designed to part sequentially at predetermined airspeeds so as to increase the air-turn-around distance in the canopy, and, therefore, delay opening times as the deployment airspeed increases.

Using non-elastic suspension lines including the pull down vent line is in consonance with current thinking among parachute designers that any elasticity in the line rigging causes high rebound forces which accentuate the end forces.

Although my prior construction accomplishes the purposes of reducing the snatch forces and opening shock forces which occur in all parachute deployments, there are several inherent disadvantages which the present invention overcomes.

As can be seen clearly in FIGS. 3-5 in the drawings of my previously filed patent, use of the breakcords at lower speeds causes the top of the fully inflated hemispherical drag surface to be severely dimpled, which substantial deformation causes instability in movement during descent due to excessive spilling of the trapped air under the canopy. Such instability produces severe oscillations that can approach a magnitude of 40° ±, causing discomfort to the parachutist, and, more important, possible injury in landing contact with the ground. This same unstable condition can arise in a high speed deployment should one of the breakcords fail to break for any reason.

It has been found, that contrary to accepted parachute design philosophy, the use of a pull down vent line having a predetermined elasticity will prevent excessive canopy deformation at the lower deployment airspeeds and avoid excessive oscillations; will simplify the construction and packaging of the chute; and will provide a smoother transition of the applied forces during deployment.

It is known in the art, as illustrated by the publication to Lisi, Ser. No. 357,045 published May 25, 1943 by the Alien Property Custodian, to fabricate a parachute with a pair of nested suspension lines, the outer suspension lines being made of elastic material. The purpose of this published construction is to vary the speed of the inflated parachute during descent by changing the area of the drag surface. However, in the present invention the purpose of the elastic pull down vent line is to decrease the inflation time of the parachute, and it cannot vary the speed of descent after the canopy is inflated.

SUMMARY OF THE INVENTION

According to the present invention, the parachute is provided with a conventional hemispherical drag surface and suspension lines, and a pull down vent line at least a portion of which is substantially elastic. The pull down vent line accomplishes its normal function of being an inflation development aid. In addition, being elastic the pull down vent line automatically controls the inflation time commensurate with parachute development airspeeds; by attaining fast inflation/development at low speeds, and progressively slower inflation/development at higher speeds. Most important, the elastic pull down vent line prevents large drag canopy surface deformation at all speeds, particularly at low speeds where it is desirable to have quicker inflation time, and where excessive oscillations are detrimental to safe, injury-free landings.

STATEMENT OF THE OBJECTS OF INVENTION

A principal object of this invention is to provide means for continuously and automatically maximizing the inflation/development time of a parachute in accordance with deployment airspeed, and, a corollary object, is to provide such a means that will prevent substantial distortion of the apex of drag surface during various deployments avoiding excessive oscillations during descent.

Other important objects are to provide an elastic pull down vent line that will simplify fabrication and packing of the parachute.

Other objects, advantages and novel features of the invention will become apparent from the following detailed description of the invention when considered in conjunction with the accompanying drawings.

DESCRIPTION OF THE PREFERRED EMBODIMENT

Figure 1:
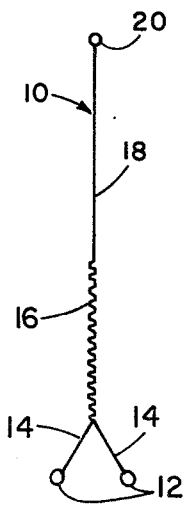
FIG. 1 is a side elevation view of the elastic pull down vent line before incorporation into a parachute canopy.

Referring to the drawings where like reference numerals refer to similar parts throughout the drawings, there is shown in FIG. 1 an elevation view of a pull down vent line 10, constructed according to the teaching of the present invention, and hereinafter referred to as a PDVL, and sometimes known in the art as an anti-squid line or an inflation/development control line.

The PDVL is formed at its lower end with a pair of riser connector attachment loops 12, each loop connected by a non-elastic line 14 joined to the lower end of an elastic line portion 16. The upper end of elastic line portion 16 is attached, such as by sewing, to a non-elastic line portion 18 which in turn terminates at its upper end in a vent line/apex attachment loop 20.

For standard hemispherical parachutes 22 (FIGS. 2-4) now employed in the U.S. Navy, PDVL 10 needs to elongate during deployment to a length approximately 150 percent of its relaxed length as will be presently described. Of course, the degree of elasticity will be selected to provide the proper elongation at the selected deployment airspeed.

Figure 2:
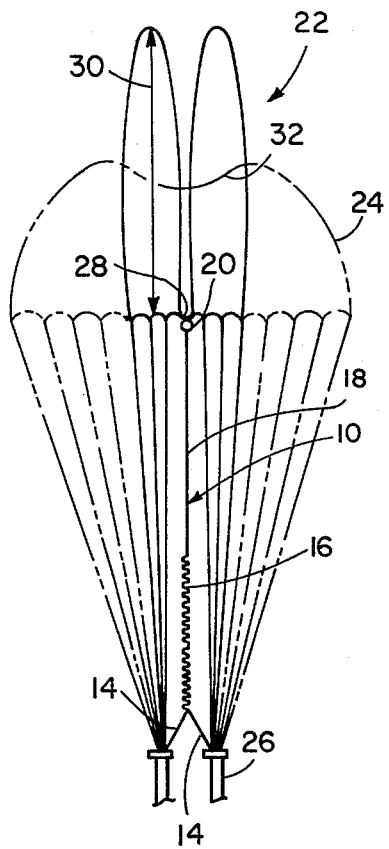
FIGS. 2-4 are diagrammatic side elevation views of the parachutes at low, intermediate, and high airspeed ejection deployments, respectively, employing the novel pull down vent line of FIG. 1, showing the drag surfaces in the full line stretch configuration by solid lines, and in the full inflation configuration by broken lines.
Figure 3:
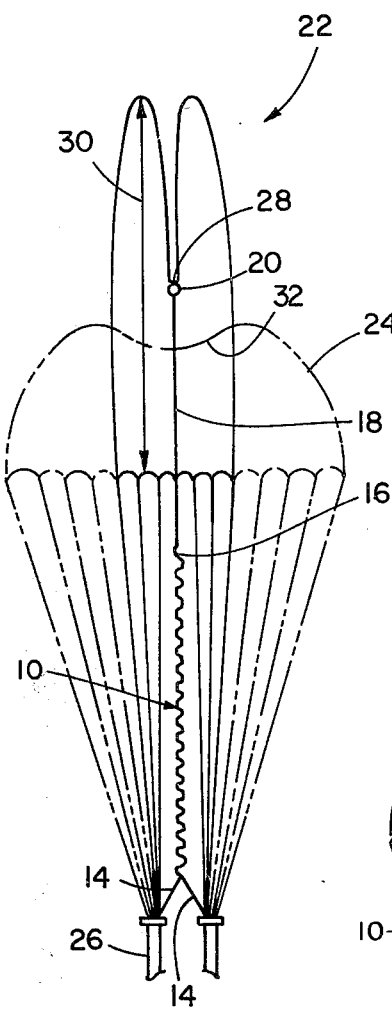
Figure 4:
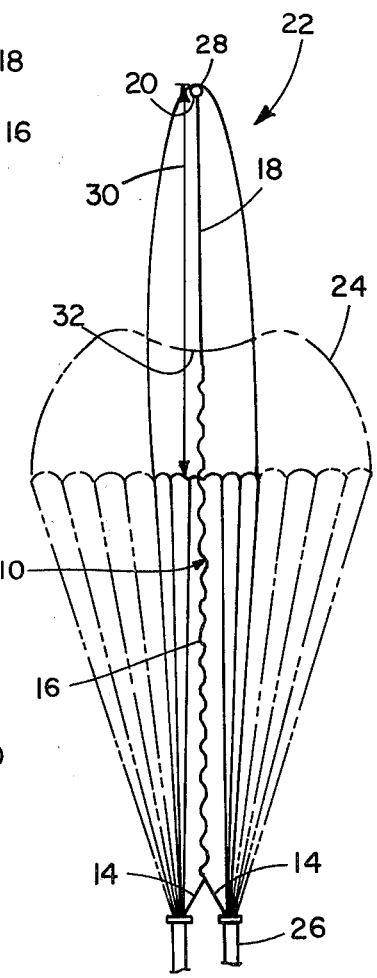

When PDVL 10 of FIG. 1 is incorporated into the parachute it affects the drag surface 24 in the manner shown in FIGS. 2–4. The pair of loops 12 of the PDVL is shown attached to the front or rear harness risers 26, and upper loop 20 is attached to the canopy vent/apex 28. In FIG. 2, parachute 22 is shown in two conditions during a low speed deployment, a condition normally under 100 Kts. The solid line condition of parachute 22 in FIG. 2 indicates the full line stretch configuration caused partially by the tension of the pilot chute (not shown) and by the trapped air compressed inside the canopy just before inflation/development occurs. As the air-turn-around distance 30 is relatively short, the inflation/development time is at a minimum and drag surface 24 quickly assumes the broken-line, fully inflated condition which is desirable for low speed deployment. It should be noticed that the length of the PDVL is constructed to be shorter than the distance from the risers to the full radius of the full canopy, so that in the fully inflated condition of the canopy the apex is slightly dimpled at 32. The slight dimpling effect increases the projected diameter of the fully inflated drag surface. However, as previously noted too large a distorion of the canopy apex will cause severe oscillation, and should be avoided in designing the length of the PDVL.

In FIG. 3 the two conditions of parachute 22 are shown at an intermediate airspeed, i.e., between 100–150 Kts. At the higher deployment speeds, the increased tensional force of the pilot chute (not shown) and the entrapped air under the drag surface causes elastic portion 16 of the PDVL to expand, further increasing turn-around distance 30 of the full line stretch condition of the canopy. This action increases the inflation/development time to be within safe limits. It should be noted that in the broken-line fully inflated condition, drag surface 24 and dimpled area 32 have substantially the same configuration as in the low speed deployment of FIG. 2.

FIG. 4 illustrates deployment of parachute 22 in a high airspeed environment, i.e., above 150 Kts. As in FIG. 3, the increased tension from the pilot chute and the trapped air in the canopy has further increased the effective length of elastic PDVL 10, simultaneously increasing turn-around-distance 30. The inflation/development time is still further increased. Similar to FIGS. 2 and 3, the optimum condition of the full inflated canopy 24 and dimpled apex 28 are substantially the same, as is the effective length of the pull down vent line. It should be noted that the effective lengths of PDVL in the full-stretch conditions in FIGS. 2–4 are only approximations.

Incorporation of an elastic PDVL in a parachute according to the teaching of the present invention will automatically provide many of the desirable characteristics of parachute deployment, such as short deflation/development time at low airspeed; medium inflation/development time at medium speeds; and disruption of the inflation/development phenomena at high airspeeds so that the inflation/development time is equal to or longer than the prior art non-elastic type of PDVL.

In an ideal situation, there is no elongation of the PDVL at zero airspeed ejection, and 100 percent elongation at 100 Kts ejection, so that a progressively longer turnaround distance is obtained. By changing the characteristics of the novel elastic PDVL, it can be designed for practically any parachute canopy, and for any desired performance envelopment of the egress system.

Obviously many modificaions and variations of the present invention are possible in the light of the above teachings. It is therefore to be understood that within the scope of the appended claims the invention may be practiced otherwise than as specifically described.

What is claimed is:

1. A parachute comprising:
   a canopy having a hemispherical drag surface with an apex;
   a set of fixed-length suspension lines connecting the canopy hem to a load;
   a vertical pull down vent line connected between the canopy apex and the load;
   at least a portion of said pull down vent line being made of elastic material extending the effective length of the pull down vent line approximately one-half of its relaxed length to vary the air-turn-around distance in the canopy depending on the parachute ejection airspeed and to vary the air-turn-around distance before the canopy fully opens;
   the relaxed length of said pull down vent line is less than the length of the line from the load to the canopy hem plus the radius of the full canopy so that the area of the canopy at the apex is dimpled in the fully inflated condition of the canopy.

* * * * *